United States Patent [19]
Brandon

[11] Patent Number: 5,951,646
[45] Date of Patent: Sep. 14, 1999

[54] SYSTEM AND METHOD FOR SCHEDULING AND PROCESSING IMAGE AND SOUND DATA

[75] Inventor: Dalbert L. Brandon, Long Beach, Calif.

[73] Assignee: America Online, Inc., Dulles, Va.

[21] Appl. No.: 08/755,586

[22] Filed: Nov. 25, 1996

[51] Int. Cl.[6] .............................. G06F 13/38; G06F 15/17
[52] U.S. Cl. ......................... 709/231; 709/236; 370/510
[58] Field of Search ..................... 395/200.61, 200.49, 395/200.66, 200.77, 114, 850, 888; 345/202, 302, 327, 328; 370/477, 510, 521; 348/7; 375/240; 379/93.08; 341/60; 382/232, 233, 244, 245, 246, 247; 709/231, 219, 236, 247; 710/68, 30

[56] References Cited

U.S. PATENT DOCUMENTS

| | | | |
|---|---|---|---|
| 5,440,677 | 8/1995 | Case et al. ............................. | 395/154 |
| 5,557,749 | 9/1996 | Norris ................................. | 395/200.18 |
| 5,581,706 | 12/1996 | Jessup, Jr. et al. ................ | 395/200.13 |
| 5,594,660 | 1/1997 | Sung et al. .............................. | 345/302 |
| 5,598,352 | 1/1997 | Rosenau et al. .................... | 364/514 A |
| 5,619,733 | 4/1997 | Noe et al. .............................. | 345/302 |
| 5,623,690 | 4/1997 | Palmer et al. ......................... | 395/806 |
| 5,631,693 | 5/1997 | Wunderlich et al. ................... | 348/7 |
| 5,642,171 | 6/1997 | Baumgartner et al. ................ | 345/302 |
| 5,659,539 | 8/1997 | Porter et al. ....................... | 395/200.61 |

*Primary Examiner*—Mark H. Rinehart
*Attorney, Agent, or Firm*—Fish & Richardson P.C.

[57] ABSTRACT

A system and method for scheduling temporal data and non-temporal data to create a unified stream of data that includes both the temporal and non-temporal data and for processing the unified data stream. The temporal and non-temporal data is preferably in a compressed format. The system preferably includes a scheduler that takes temporal data (e.g., sound data) and non-temporal data (e.g., image data) and interleaves them together to form the unified data stream. The system also includes a processor that decompresses the compressed image data and produces an output image from both the decompressed image data and any uncompressed image data. The processor also plays the temporal data while it concurrently decompresses the compressed temporal data. The system can handle temporal data in any format, including voice data and MIDI files, as well as any type of image data, including videos and still images. Also disclosed is a method for scheduling and playing video data and sound data (including MIDI and voice) forming a computer slide-show, in which the video and sound data are interleaved into a unified data stream.

48 Claims, 8 Drawing Sheets

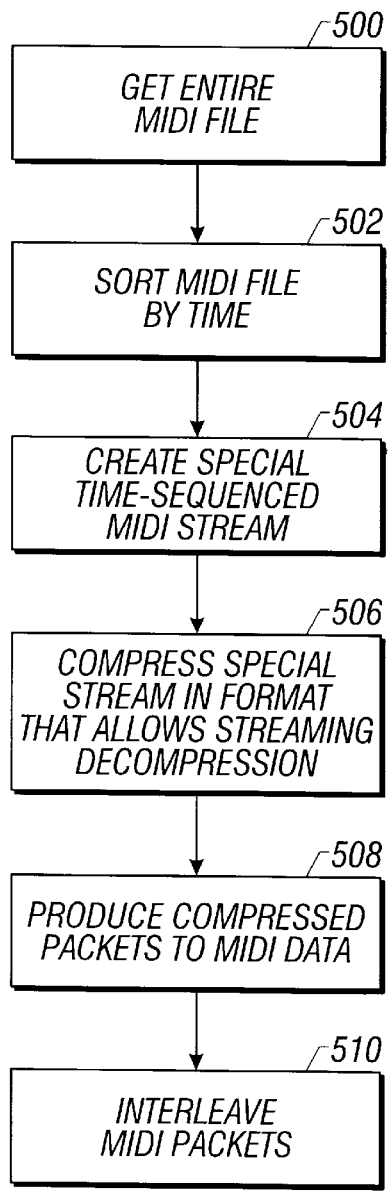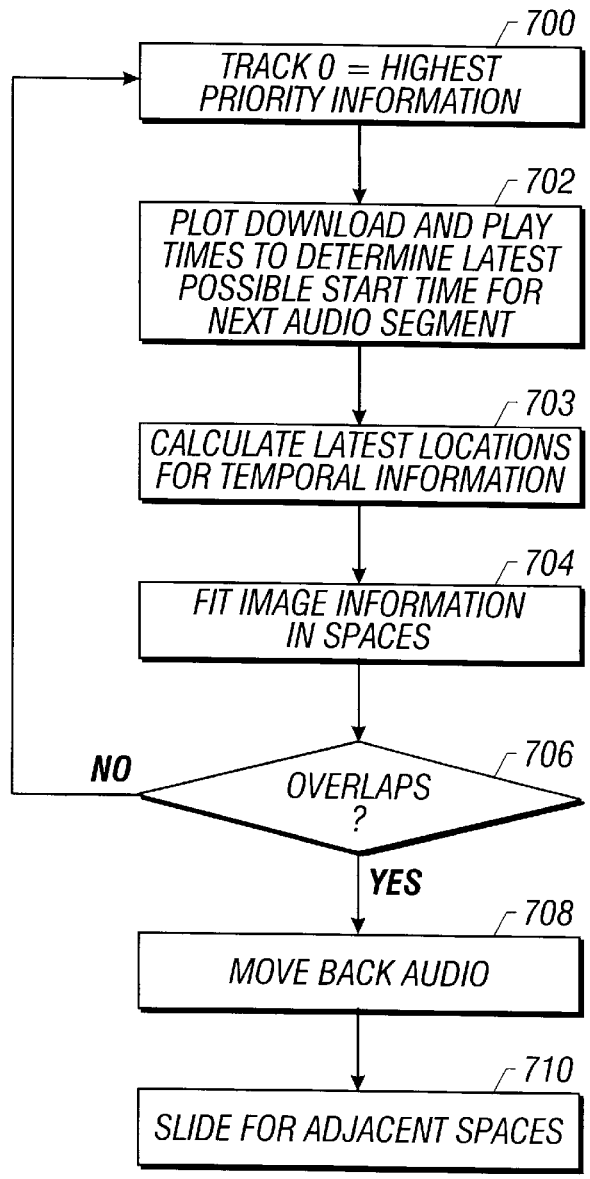
*FIG. 5*    *FIG. 7*

SYSTEM AND METHOD FOR SCHEDULING AND PROCESSING IMAGE AND SOUND DATA

BACKGROUND OF THE INVENTION

Field of the Invention

The present invention defines an image and sound scheduling and processing system that allows images and sound to be interleaved into a unified data stream and allows processing of the unified data stream.

SUMMARY AND BACKGROUND OF THE INVENTION

Multimedia is the science of converting both images and sound into appropriate data indicative of the images and sound transmitting the data over a channel to a final destination. As the bandwidth of the channel becomes more limited, it becomes more desirable to further compress the form of the images and sound.

Images and sound are commonly transmitted via wire line transmission, such as over a phone line using a modem. Information compression increases the amount of data that can be sent over this limited bandwidth channel.

Various techniques are known in the art for compressing sound and image data. For example, image data can be stored as "GIF" images or "JPEG" images, as is known in the art. Images can also be compressed using the techniques described in co-pending U.S. patent application Ser. Nos. 08/636,170; 08/545,513; and 08/275,945, which are all assigned to the assignee of the present invention.

Sound compression is also well known. One particularly preferred form of sound compression uses a vocoder to compress the voice sound. Vocoder technology is well established. Music can also be transmitted in the MIDI format. MIDI sound is transmitted as a series of notes versus times, all of the notes being played together in order to form the final sound.

The success of many compression techniques relies on the similarity between information at two different temporal instances. Most compression techniques are based on the model that real world information does not change very much in the short term. Hence, over time, many images will have more similarities than differences. Also, many animation sequences have more similarities than differences between subsequent sequences. Sounds, too, can be compressed, because short term changes are very small. Sound can be further compressed by modeling the sound using various well-known techniques. An example of a sound compression technique is described in co-pending U.S. patent application Ser. No. 08/545,487, assigned to the assignee of the present invention.

Generally, sound and images must be compressed using very different technologies. While it is possible to compress both the sound and the image using the same technology, the resulting compression is optimized for neither the sound nor the image. Still, it would be desirable for the sound and image information to be sent together over a common channel.

Therefore, it is an object of the present invention to define special ways of processing the sound and image in order to facilitate their being sent over a common channel. The present invention includes special processing techniques that render the processing of the sound and image more efficient.

In a first embodiment, the present invention is a sound transmitting system operating over a limited bandwidth channel. The system includes a first element, configured to receive a sequence of sound to be coded. The system further includes an analyzer element, reviewing a portion of the sequence of sound, and analyzing the sequence of sound to determine an amount of data that can be supplied over the limited bandwidth channel. Finally, the system includes a computing element that computes an amount of data that can be transmitted and determines a shortage of data that could lead to a possible system stall. The computing element includes a system look-ahead that can detect a stall, and if a stall is detected, can find whether a breakpoint in the sequence of sound and can stop the sequence of sound at the breakpoint.

In another embodiment, the present invention is a method for processing image data and sound data in a unified data stream. The method includes the following steps: (a) interleaving image data and sound data to form a unified data stream, at least some of the image data being in an image compressed format and at least some of the sound data being in a sound compressed format; and (b) processing the unified data stream. In step (b), the image data in the image compressed format is decompressed and an output image is produced from the decompressed image data and any uncompressed image data, the sound data is concurrently played while being decompressed.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

These and other aspects of the invention will now be described in detail with reference to the accompanying drawings, wherein:

FIG. 5 is a flow diagram showing the process by which a MIDI file is played.

FIG. 7 is a flow diagram showing how interleaved sound and image data is scheduled.

Like reference numbers and designations in the various drawings indicate like elements.

DETAILED DESCRIPTION OF THE INVENTION

Figure 1:
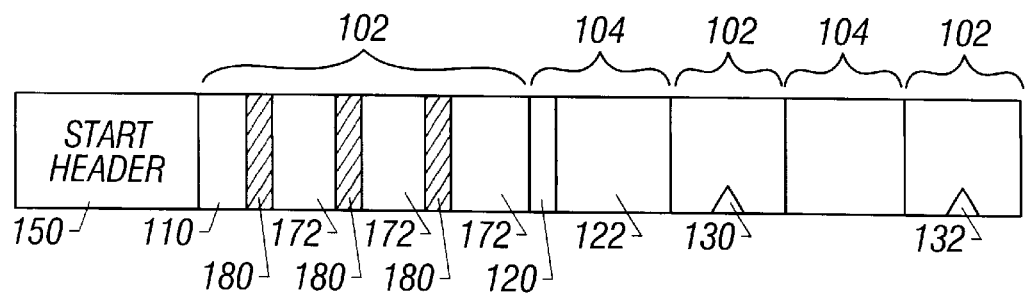
FIG. 1 shows a data format in accordance with the present invention.

Throughout this description, the preferred embodiment and examples shown should be considered as exemplars, rather than as limitations on the present invention. The preferred embodiment processes data from a number of sources and accumulates this data together in special ways that are described in this specification.

In accordance with the present invention, the speech data can take any known voice-coded form. The speech data is then encoded as a series of packets. The first portion of the packet indicates the length of the packet, typically between 1 and 256 bytes. In this embodiment, each packet represents approximately 240 ms of sound. A more precise playing time can be determined by queuing the speech code with the packet. The first portion of the packet also includes further information about the nature of packet. Natural speech often includes natural breaks, such as pauses between sentences, within sentences, or even pauses within a word. The first portion also describes these natural break points in the voice-coded information. As will be described in detail below, these break points provide a special advantage that is utilized in the present invention.

The system of the present invention looks ahead to determine how much data can be supplied over the limited bandwidth channel. There may come a point where the look-ahead indicates a possible system stall: i.e., there is not enough data to continue without guaranteed uninterrupted play. Such a stall may produce a very unnatural sound. In the system of the present invention, if a stall is detected by the system look-ahead, that stall causes a pause at a natural breakpoint. This minimizes unnatural feeling in the sound.

An ultimate goal of this invention is to combine temporal data with non-temporal data in a unified data stream. The term "temporal data" refers to information that should be played in a non-interrupted manner and includes data that must be delivered at a particular time, although not necessarily executed temporally. Examples of temporal data include sound, MIDI, video, and some commands. The term "non-temporal data" refers to information that need not be played in a non-interrupted manner, including image data and certain command data, such as commands that affect display of an image. For convenience, in some parts of this description, temporal data will be described strictly as sound data, and non-temporal data will be described strictly as image data. It will be understood, however, that temporal and non-temporal data are not so limited and are to be construed to have their broadest possible meaning.

The image information is preferably obtained in tagged run-length form. The tag includes a header that describes the length and type of information. For example, the information can be compressed in any of a number of different forms, including Huffman, table form, VQ, DCT, or the like. The initial packet can also provide additional description of the information.

The sound and image data are each formed into segments. Each segment may contain many packets, which, as described above, may be 1–256 bytes in length. An image segment is typically much longer than a sound segment. An image segment can range between about 1 and 32 kb. Sound packets can be collected into one segment that may also range between about 1 and 32 kb. It should be understood, however, that the length of segments stated herein is merely exemplary and that other length segments could be employed.

In this invention, the packets of temporal data (e.g., sound) are interleaved between packets of non-temporal data (e.g., image data), as described in more detail below. This combined sound and image packager is referred to in this description as the "scheduler." The scheduler will also be described in detail below.

The resulting data format 100 is shown in FIG. 1, which shows temporal data packets (e.g., sound) 102 interleaved between non-temporal data segments (e.g, image) 104. Each temporal data packet 102 includes a header portion 110, which may include information like the "first portion" described above and preferably provides information about the type of temporal data contained in the packet (e.g, sound, MIDI, control data). Each temporal data packet 102 also includes data sections, which includes sound data 172 separated by run-length bytes 180. Each non-temporal, or image, segment 104 also includes a header portion 120 and image data 122. Markers 130, 132 are placed at various times within the temporal data packets 102. In addition, a startup header 150 can be used to set various parameters for the data format 100. The markers 130, 132 and the startup header 150 will be described in detail below. It will be understood that the temporal data packets 102 are not limited to voice-coded packets, but may also include video and music sound, either compressed or uncompressed. Also, any known technique can be used to embody the sounds, including, MIDI, FM synthesizing, or any other technique, and the sounds can be reproduced by any known technique.

Figure 2A:
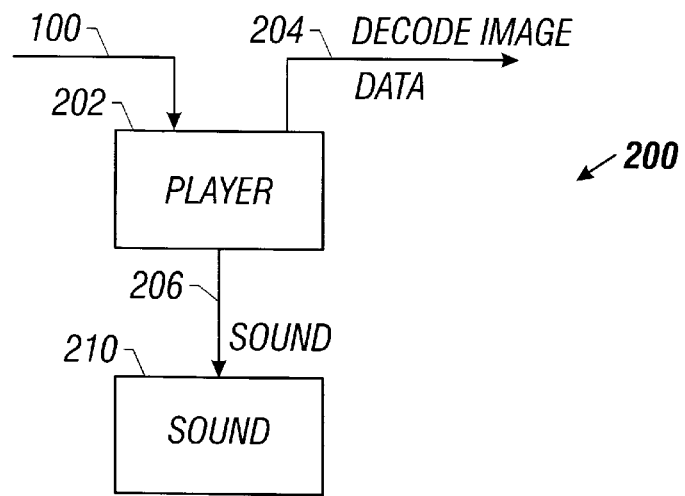
FIGS. 2A and 2B are block diagrams of two embodiments of a player for the data format of FIG. 1.

The player operation is described with reference to FIG. 2A, which shows a pass-through system 200. A particularly important feature of the technique of the present invention takes advantage of the way that image decoding software has often operated. Image decoding software needs to decode specially-coded blocks of image information. Most image decoders of this kind will decode only those images whose format the decoder recognizes. The decoder will discard any data that does not fit the criteria for the preferred data. The combined image and sound information 100 of the form shown in FIG. 1 is passed to an image player 202. The image player 202 produces the output image 204 and ignores the sound data 206. The image player 202, however, is of the pass-through type. Consequently, the sound data 206 is passed to a dedicated sound player module 210. The dedicated sound player module 210 operates as described herein to further play the sound information.

It will be recognized that the system of the present invention can be formed as a number of hardware modules (i.e., as a "multi-threaded" system) using lookup tables and other hard coding. The system is more preferably implemented in software, in which case all of the coding modules would be embodied as APIs in dynamic link libraries ("DLLs"), in a multi-threaded operating system. The system can also be embodied as a "single-threaded" system.

Figure 2B:
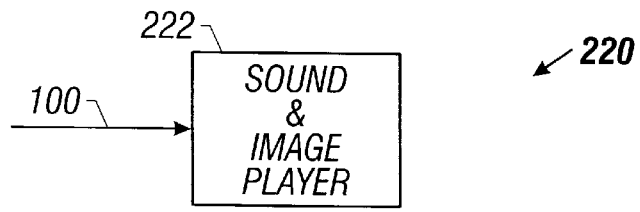

A second embodiment of the player is a nonpass-through (or single threaded) system 220, as shown in FIG. 2B. In this embodiment, the application is built to know which parts of the data stream 100 are sound, and which parts are not. The sound parts are sent directly to the player 222, which operates as described herein.

Figure 3:
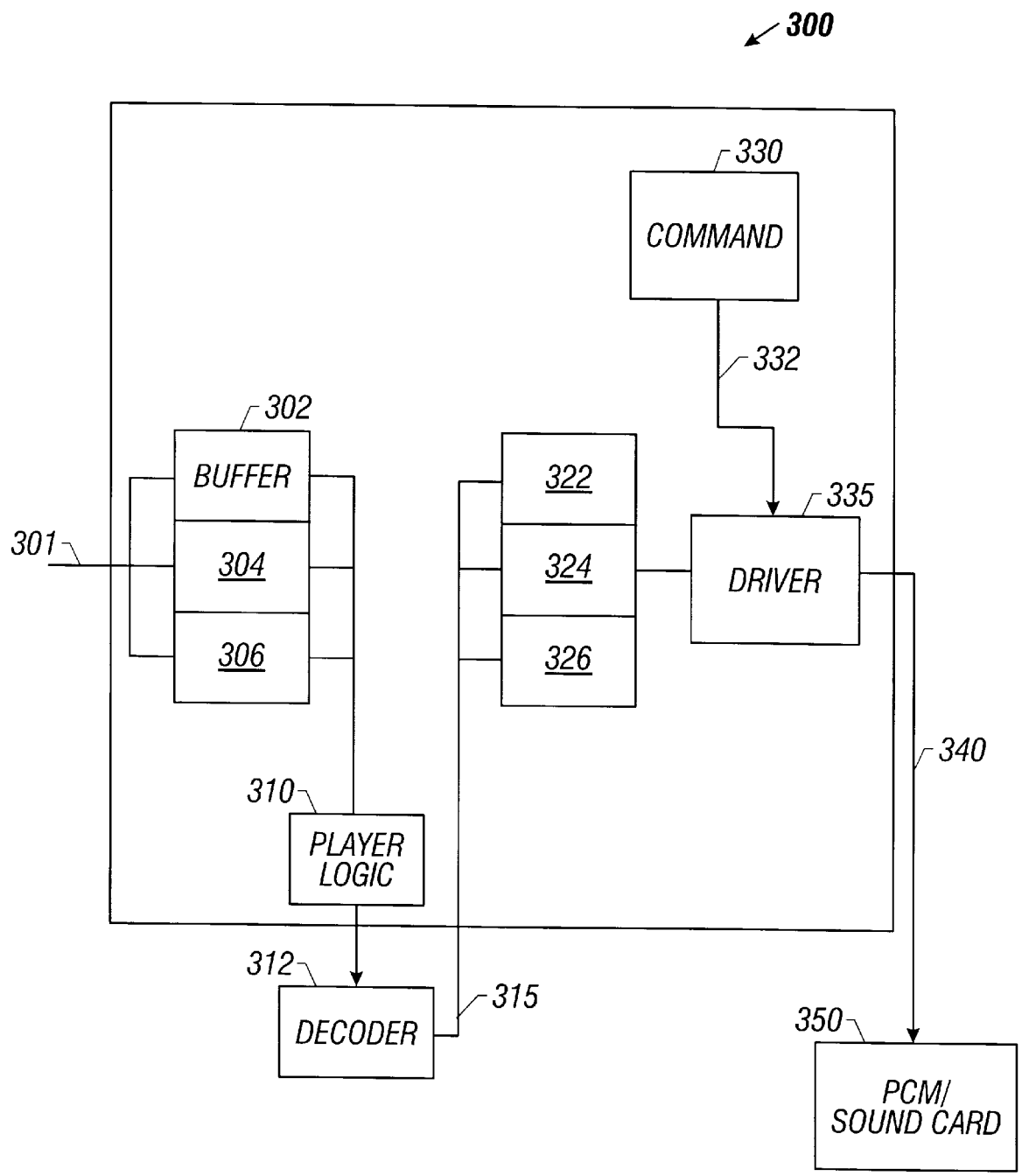
FIG. 3 is a block diagram showing in greater detail the player of FIG. 2.

The preferred sound player 300 is shown in FIG. 3. Compressed sound data 301 is input to a series of input buffers 302, 304, and 306. Each input buffer 302, 304, 306 stores a certain amount of the sound data 301. A player logic element 310 controls operation of all the input buffers 302, 304, 306, by controlling a multiplexing protocol to choose data from the next buffer that needs to be emptied. Compressed data from the input buffers 302, 304, 306 is output by the player logic element 310 into a decoder 312. The decoder 312 uses the opposite coding system to that used for coding to produce a pulse code modulated ("PCM") sound data stream 315. It should be understood that the PCM sound data can be any kind of audio or voice data.

The output PCM sound data 315 is sent from the decoder 312 to a plurality of output buffers 322, 324, 326. Output buffers 322, 324, 326 respectively store the output PCM sound data 315.

The playing operation is commanded by an overall command module 330 which produces a play command 332. A play driver 335 determines which of output buffers 322, 324, 326 is the next buffer to be processed. Information from the next output buffer is obtained and output as output PCM information 340. An additional format translation system 350 (e.g., a PCM sound card) converts the PCM information 340 to the desired format, e.g., FM synthesized sound card format, operator synthesis, or MIDI.

An important feature of the sound player operation shown in FIG. 3 is its ability to decompress as it continues its operation; that is, the sound player 300 decompresses data on the fly. The multiple buffer structure of the sound player 300 facilitates the decoder 312 decoding the contents of an input buffer and outputting those contents to a different empty output buffer. The empty output buffer can then be appropriately processed. Importantly, there is no need to decompress the whole file before playing the sound, because the information is decompressed on the fly.

As part of this ability to decompress on the fly, moreover, the sound player 300 must have certain intelligence. The player logic element 310 must determine whether it can continue playing based on the amount of sound in an input buffer 302, 304, 306. The sound in the input buffer is limited by the amount of sound that can be transmitted over a limited-bandwidth channel. The operation continues by determining a graphical relationship between the amount of data and its playing time.

Figure 4:
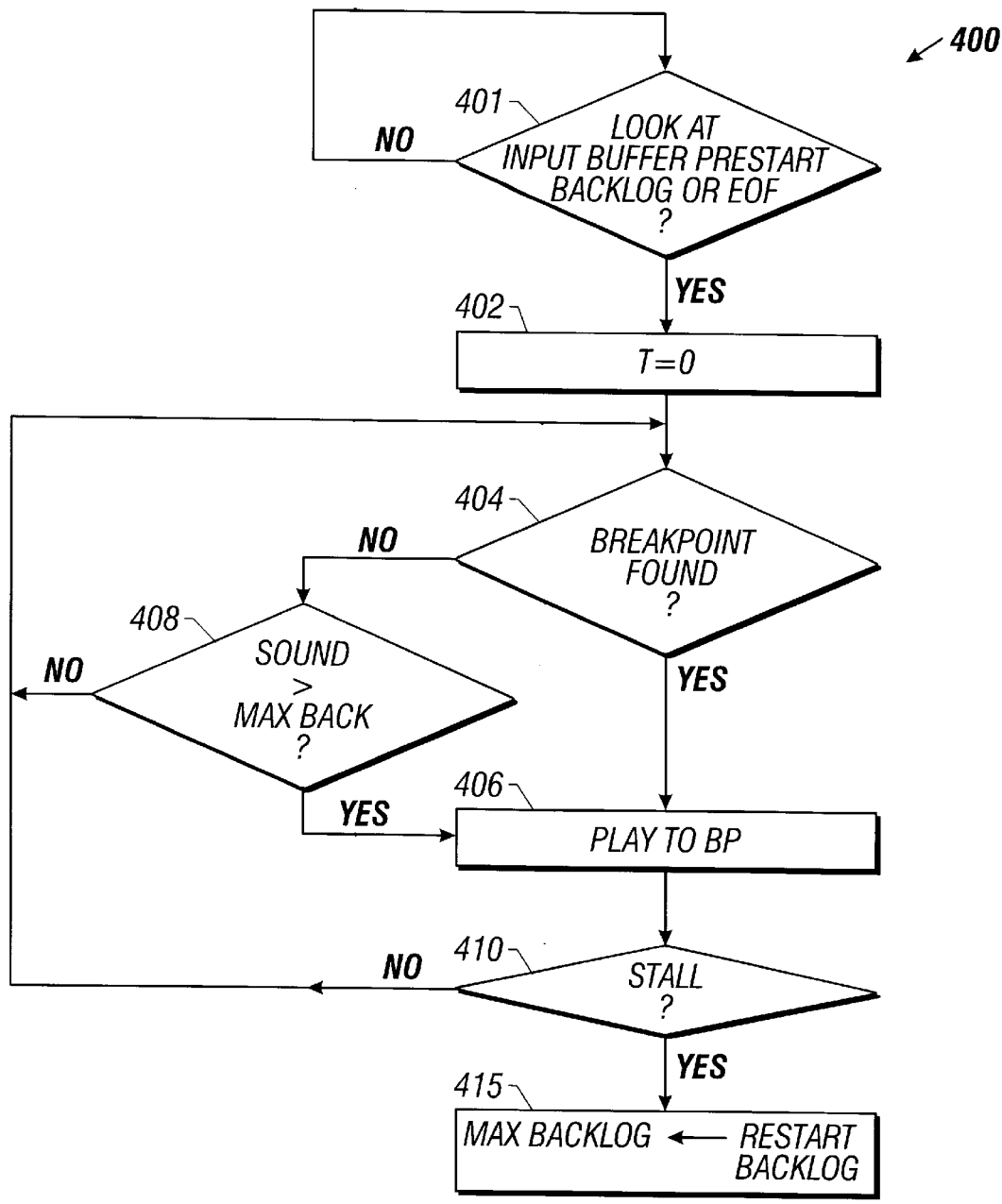
FIG. 4 is a flow diagram showing the process by which the player operates.

A flowchart of the operation of the sound player 300 is shown in FIG. 4. At step 401, the player logic element 310 investigates the input buffers 302, 304, 306 to determine if there is a predetermined amount of information in the buffers. This predetermined amount of information is labeled the "prestart backlog." The prestart backlog is an amount of data that is set to be sufficient to allow safe operation of the sound player 300. In this description, various timing according to the present invention is considered with reference to after filling of the prestart backlog. This prestart backlog is used to provide a buffer after which the playing can occur. An end of file ("EOF") indication will always start operation of the sound player 300, even if stored data amount in the input buffer is not equal to the prestart backlog.

If the prestart backlog or EOF is determined at step 401, the player operation defines time zero (T=0), shown as step 402. Step 404 analyzes the sound sequence in the input buffers 302, 304, 306, by looking forward to a breakpoint in the sound data. If a breakpoint is found, sound playing begins at step 406, and sound is played until reaching the breakpoint. If, on the other hand, no breakpoint is found at step 404, operation passes to step 408, which determines whether the amount of data in the input buffers 302, 304, 306 is greater than a maximum backlog allowed according to the present invention ("maxbacklog"). If not, control passes back to step 404 to look for a breakpoint ahead in the sound data.

If either a break point is determined at 404, or the maxbacklog is determined at step 408, the stored sound is played at step 406. The playing should continue until a breakpoint is encountered.

Step 410 determines a stall condition. The stall condition is caused by a loss of data without a breakpoint at which to interrupt. This condition causes the reproduced sound to stop at an unnatural location. Detection of a stall in step 410 indicates that the character of the data is such that a stall is likely to occur. This is handled by replacing the maxbacklog with a restart backlog value at step 415. The restart backlog increases the amount of data that needs to be in the input buffer backlog, to make it less likely that another stall will occur.

An important feature of the present invention is the ability to measure the actual baud rate at which sound data is being transmitted. Referring to FIG. 1, markers 130, 132 are placed at various times within the sound packets 102. The distance between the markers 130, 132 indicates a specific amount of sound data time. The time when each marker 130, 132 is received is noted. The time between marker receipts is determined, and that time is divided by the actual playing time between the marker receipts. This allows determination of the baud rate for the sound data, even though image data has been mixed in with the baud rate for sound.

The startup header 150 can be used to set the original parameters, such as original backlog, maxbacklog, and restart backlog. This allows these parameters to be coded separately for each slice into the system. It also permits different kinds of data to have different backlog amounts.

MIDI represents a preferred type of sound that is used according to the present invention. MIDI files are well-used in the computer art. A Windows™ MIDI file includes a number of items of information, including sounds and times for each instrument. Each track of the MIDI file represents an instrument and includes a plurality of times and other information messages.

In the prior art, because the sound is a combination of the various MIDI tracks, it was necessary to obtain all of the tracks and attach them all together before any could be played. Thus, each track may include many messages, each including times and data. All of these MIDI file information pieces must be correlated with one another to form the overall instrument sound. It is standard in the art, therefore, to receive the entire MIDI file and correlate it together before anything is played. The present invention describes techniques of MIDI processing to enable playing MIDI on the fly.

The standard format MIDI file according to the present invention is pre-processed by a special translator that translates the standard MIDI format into a special MIDI format. This special format groups together all messages for a certain time. Once all the messages for the specific time are read, that portion of the MIDI file can be played. This enables part of the MIDI file to be played before the entire MIDI file is received.

FIG. 5 shows the process for playing MIDI files on the fly. Step 500 obtains the entire MIDI file, including all of the MIDI messages described above. Step 502 sorts the MIDI file by time such that messages for a specific time are maintained together. This sorted file is somewhat longer than a normal MIDI file, but sorted by time. Because the sorting is by time, a specific time can be played before the whole MIDI file is received. Step 504 creates a special time sequenced MIDI data stream. Then, in step 506, the special MIDI data stream is compressed, preferably in a format that allows streaming decompression.

Step 508 produces compressed packets of MIDI data, which are interleaved with other data packets in unified data steam.

An important question is how to schedule this interleaved information into a unified stream of sound and image data. This is done by the improved scheduler of the present invention.

Figure 6:
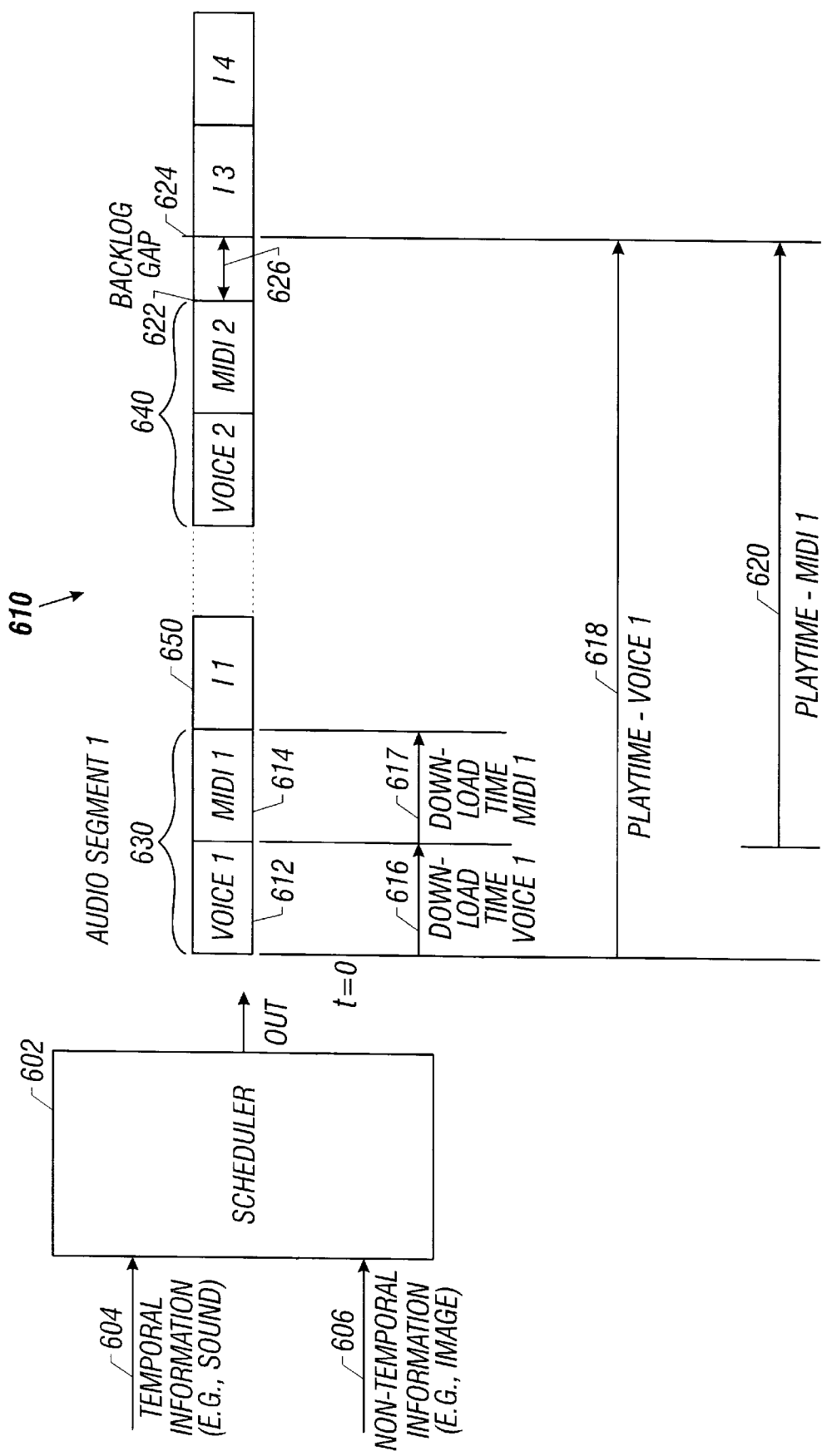
FIG. 6 shows a scheduler that interleaves sound and image information into a single data stream in accordance with the present invention.

FIG. 6 is a block diagram of the preferred scheduler 602. It should be understood that the scheduler 602 is preferably formed of software modules, although the scheduler 602 can be formed of hardware devices that perform the same functions. The scheduler 602 receives temporal information 604, i.e., information that is important to be played in a non-interrupted manner, such as sound. The scheduler 602 also receives non-temporal information 606, such as image data. The scheduler 602 interleaves all of this information together to create streams of scheduled information 610, as shown in FIG. 6.

The scheduling operation is carried out as follows. First, in this example, the scheduler 602 decides that track 0 will be the voice. The scheduler 602 places a voice segment 1 612 at time zero ($t_0$) and a MIDI segment 1 614 at time $t_0+V_0$ where $V_0$ is the download time 616. Note that voice segment 1 612 and MIDI block 1 614 have play times that are longer than their download times. Therefore, the play time 618 for MIDI segment 1 614 is longer than its download time 617. In a similar way, voice segment 1 612 has a play time 620 that is longer than its download time 616.

The play time defines when the next voice/MIDI value will be necessary—at time 622. The play time for audio segment 1 630 ends at time 624. The scheduler 602 places a backlog gap 626 between the end of the download for the next audio segment 640 and the end 624 of the playtime 618, 620 for audio segment 630. Accordingly, the scheduler 602 sets a minimum start time 622 for the next audio segment 640.

It was recognized, however, that such scheduling leaves gaps between the audio segments 630, 640. Moreover, the minimum play times are the latest possible times when the audio segments 630, 640 can be produced. The audio segments 630, 640 can be downloaded at any time earlier than the minimum play times, as necessary. The gaps between the audio segments are used to store image segments, such as I1 650.

If there is a scheduling overlap between an image segment and an audio segment, the audio segment is moved to an earlier time in order to leave more room for the image segment. In addition, if necessary, audio segments can be split at break points.

The overall operation of the scheduler 602 follows the flowchart of FIG. 7. Step 700 puts the highest priority information in a first track ("Track 0"). Step 702 plots out download times and play times to determine a latest possible start time ("st") for the next audio segment, in accordance with the following equation:

$$(1) st_n = pt_{n-1} - \max \text{gap} - dt \max \text{backlog}_n,$$

In Equation (1), "n" is the current block, "n-1" is the previous block, "dt" is the download time, and "pt" is the playback time. All of the temporal information, i.e., all information that needs to be played without interruption, is placed in its latest possible location at step 703 to form an initial map. At step 704, the image information is fit into the gaps between adjacent audio segments. Step 706 determines any overlaps between any of the information. If any overlaps are found in step 706, audio segments are moved back in step 708 to avoid the overlap. Otherwise, the process starts again at step 700.

After all overlaps are eliminated, step 710 determines if any adjacent audio segments can be placed next to one another without any gap between them. If so, such adjacent audio segments are placed next to each other at step 710 to conserve the header space that would otherwise be necessary for two separate segments. Step 710 also removes all dead spaces between audio and image elements by sliding back the elements, that is, by scheduling the elements for an earlier download.

Startup of the scheduler 602 is taken at time zero ($t_0$) once the original backlog has been entered into some buffer. Remember, as above, the original backlog is a value that has been set, but that can be reset for any information, as desired.

The place and slide algorithm described above with respect to step 710 operates by determining the latest possible point for information and sliding time backwards to accommodate it. Various refinements are also contemplated, such as separating at breakpoints and other techniques.

Figure 8:
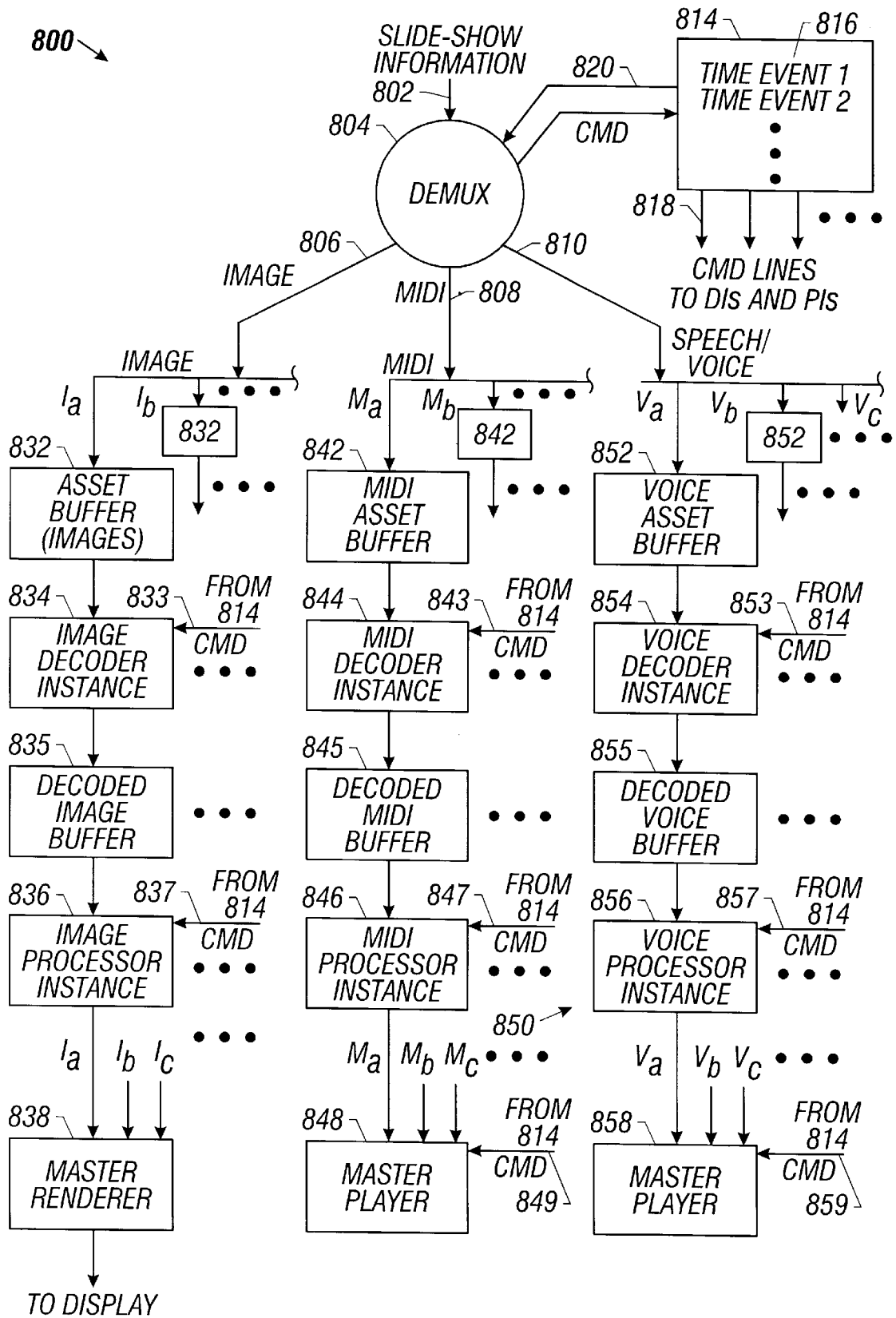
FIG. 8 is a block diagram of an integrated player system for a progressive slide show player in accordance with the present invention.

An exemplary integrated slide-show player system 800 is shown in FIG. 8. A data stream 802 of slide-show information is input to a demultiplexer ("demux") 804, preferably in a proprietary format known herein as the "Art Format." The demux 804 analyzes the data stream 802 to determine its component parts, which, as in the example of FIG. 8, may include image 806, MIDI 808, and speech/voice 810.

A set of commands 812 is also divided from the data stream 802 and output to a control element 814 for processing. The control element 814 preferably uses the techniques previously described, including determining backlog and play time, as part of the playing sequence. The control element 814 uses the commands 812 to form an event table 816. The event table 816 is of the format including a specific time and a list of the events that occur at that time. The entries in the event table 816 are used to generate processing commands 818 that are sent by control element 814 to other elements in the player 800, as will be described below. The event table 916 is also used to form connections between selected elements, as will also be described below.

The control element 814 also includes a feedback line 820 that is used to send programming commands back to the demux 804. While the demux 804 has certain built-in intelligence, allowing it to discern between various types of data and commands, it may not be able to perform other functions with its built-in intelligence. For example, the demux 804 may be incapable of splitting instances within an output data stream. By adding the feedback line 820, the demux 804 may be given added intelligence. In particular, the feedback line 820 allows the author of a slide-show to program the demux 804, as desired, by inserting commands into the data stream 802 that the feedback line 820 sends to the demux 804 to control certain functionality of the demux 804.

The demux 804 also sends image data 806, MIDI data 808, and speech/voice data 810 to various a respective data processing chain 830, 840, 850. As is shown in FIG. 8, each data processing chain 830, 840, 850 may include multiple instance chains (i.e., may be multi-threaded). For example, the image data processing chain 830 and voice data processing chain 840 may each include multiple "asset" instance chains ($I_a$, $I_b$, etc., for the image data 806, and $V_a$, $V_b$, etc., for the voice data 810). Each of the image asset instances controls an asset of the image data 806, and each of the voice asset instances controls an asset of the voice data 810. Similarly, the MIDI chain 840 has multiple "clip" instance chains ($M_a$, $M_b$, etc.), each of which controls a clip from the MIDI file. The author of the slide-show may define each of the image and voice assets and MIDI clips. For example, the author may define a first image asset ($I_a$) to be the image background, a second image asset ($I_b$) to be a foreground element of the overall image, and so on.

The first element in each of the data processing chains 830, 840, 850 is a buffer 832, 842, 852, respectively, which are preferably software buffers. (For simplicity, the remainder of the description will be limited to the image chain 830, unless otherwise noted.) The asset buffer 832 stores a predetermined amount of image information that forms a block of image information. When the (preferably) compressed data is stored, the event table 816 sends a start command 833 that starts a decoder instance element ("DI") 834, forming a connection between the asset buffer 832 and the DI 834. The DI 834 receives the compressed image data from the asset buffer 834 and decompresses the data to output pixel data. After the DI 834 decodes the pixel data, it may be stored in a decoded image buffer 835 and/or be further processed. Once the pixel data exits the DI 834, the DI 834 can be freed for other use.

An important feature of the player 800 of the present invention is its ability to operate in a progressively rendering environment. This is accomplished, for example, by setting the DI 834 to decode on the fly, i.e., as the asset buffer 832 is being filled with image data. In addition, the Art Format according to the present invention may operate by initially sending a low resolution version (or splash) of the video image, which is followed by further details about the image. The integrated slide-show player 800 of the present invention and other systems described herein enable first sending a splash image in the data stream 802, displaying the splash, and later sending more information about the image in the data stream 802. This can be done while other information, including voice data 810 and MIDI data 808, is being sent simultaneously. In addition, the progressive rendering capability of the player 800 allows a viewer to shuttle forward, pause, etc., even though the player 800 has not received all of the data in the data stream 802. In such a case, for example, if the viewer has paused at time t=x within the slide-show, the image will render-in as time progresses. This can occur at any given point within the slide-show, regardless of the amount of data 802 received by the player 800.

An image processor instance ("IMI") 836 can also be started by the event table 816, which causes the control element 814 to send an IMI command 837 to the IMI 836. The multi-threaded IMIs 836 are used to make various changes to the pixel data, such as moving the position of the pixel data, tilting the pixel data, or changing aspects (e.g., color or size) of the pixel data. Each IMI processes its respective asset of the overall image to be displayed. Depending on how the slide-show is authored, at a different point in time in the slide-show, different image assets can be displayed. Moreover, assets can be added on a piecemeal basis, creating a "montage" effect. Alternatively, or in addition, the resolution of animated images can be improved as more image data arrives. Thus, in accordance with the present invention, the slide-show author can have complete control over the display of any portion of the animated images, including the timing for displaying various image assets and the quality (or resolution) of their display.

After the IMI 836 completes its operations, the IMI 836 can be removed from the processing chain to free its resources for use by other units. The image data output from all the IMIs 836 (i. e., $I_a$, $I_b$, $I_c$, etc.) is sent to a master renderer 838 and/or to another buffer (not shown), which sends the rendered and composited image to a display. For MIDI and voice data, the IMIs 846, 856 output the data to a master player 848, 858, which can receive commands 849, 859 from the control element 814 to control playing of the sound and MIDI clips. The multi-threaded environment means that many of these instances and processes can be simultaneously running. The number of simultaneously running processes is limited only by system resources.

Importantly, the same image can stay in the decoded image buffer 835, even though the DI 834 and/or the IMI 836 have completed their operations. As a result, that same data may be re-processed by a new DI and image-processed in a different way. The DIs 834 that are not being used, however, are removed to free system resources.

As described above, the commands 833, 837 create links between the various processors. Although not shown, an asset buffer 832 may be coupled to any one or a plurality of non-temporals 834. Consequently, for example, a command could create a link between the DI 834 in the $I_a$ asset chain and the asset buffer 832 in the $I_b$ asset chain. Another command 837 could then be sent the IMI 836 in the $I_c$ asset chain, meaning that $IMI_c$ should carry out scaling or some other operation on the image data in the $I_c$ asset chain. The master renderer 838 determines the position of the image, e.g, that the image should be placed at position (x, y) on a display (not shown).

Once the image is on the display, it can be left as is, taking away the computer intensive processing resources. The image can also be rotated, scaled, color altered, or the like, by reinitiating the IMI 836. As described above, moreover, a relatively low level animation can be carried out with the data being improved on the fly with more resolution. Because the decoded image buffer 835 can be maintained, additional information about the image can also be obtained.

Figure 9:
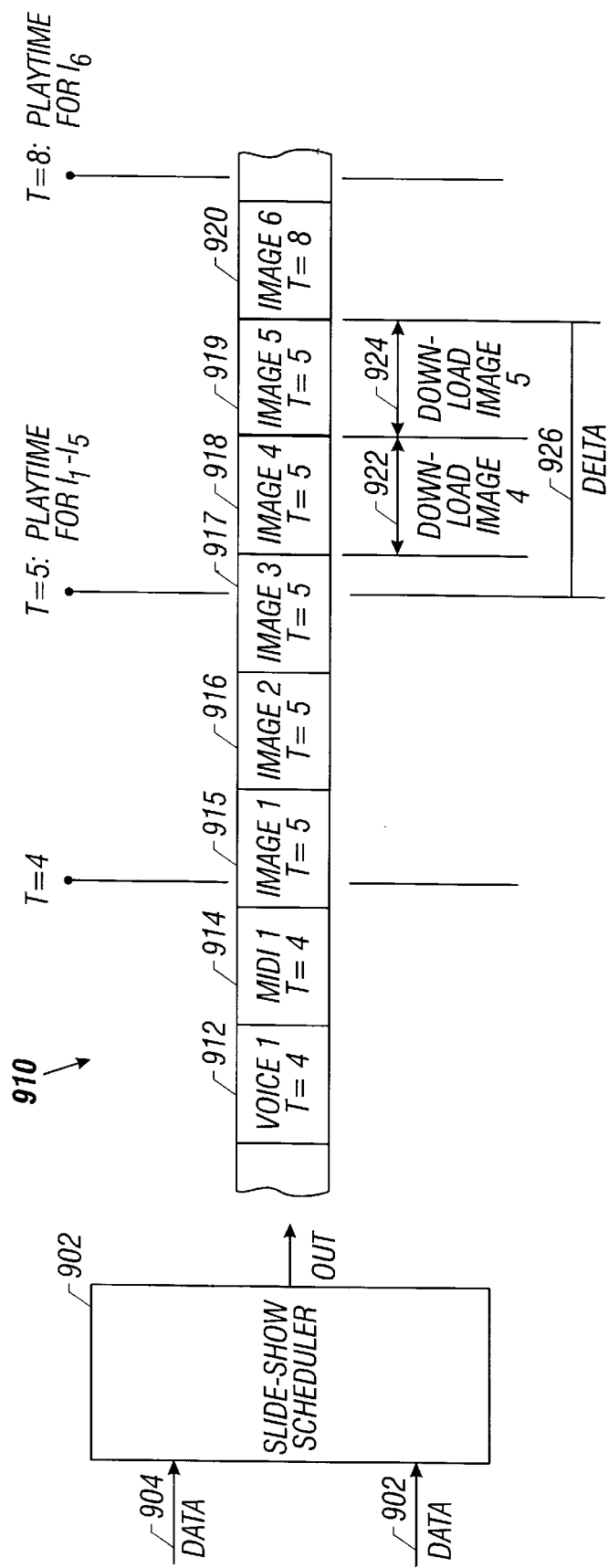
FIG. 9 shows a scheduler that interleaves the constituent data of a progressive slide into a single data stream in accordance with the present invention.

FIG. 9 shows a slide show scheduler 902 in accordance with the present invention. Temporal data 904 and non-temporal data 906 are input to the scheduler 902, which schedules both types of data and interleaves them into a unified stream of slide show data 910. In the example of FIG. 9, the scheduler 902 has placed six packets of video animation data ($I_1$–$I_6$) 915–920 in the data stream 910 adjacent one another. Before the video image packets, the scheduler 902 has placed a first voice data packet ($V_1$) 912 and a first MIDI data packet ($MIDI_1$) 914 in the data stream 910 before the image packets 915–920. Each sound-related packet, $V_1$ 912 and $MIDI_1$ 914, has a playtime of T=4, and each of the image packets $I_1$–$I_5$ has a playtime of T=5, while $I_6$ has a playtime of T=6. The method for scheduling will be described in detail below.

It is seen in FIG. 9, however, that the download times 922, 924, respectively, for $I_4$ and $I_5$ are after the T=5 playtime has already expired. This will cause unnatural breaks or stalls in the video portion of the slide-show. Accordingly, the present invention provides a mechanism by which such stalls can be minimized, or at least substantially reduced.

Figure 10:
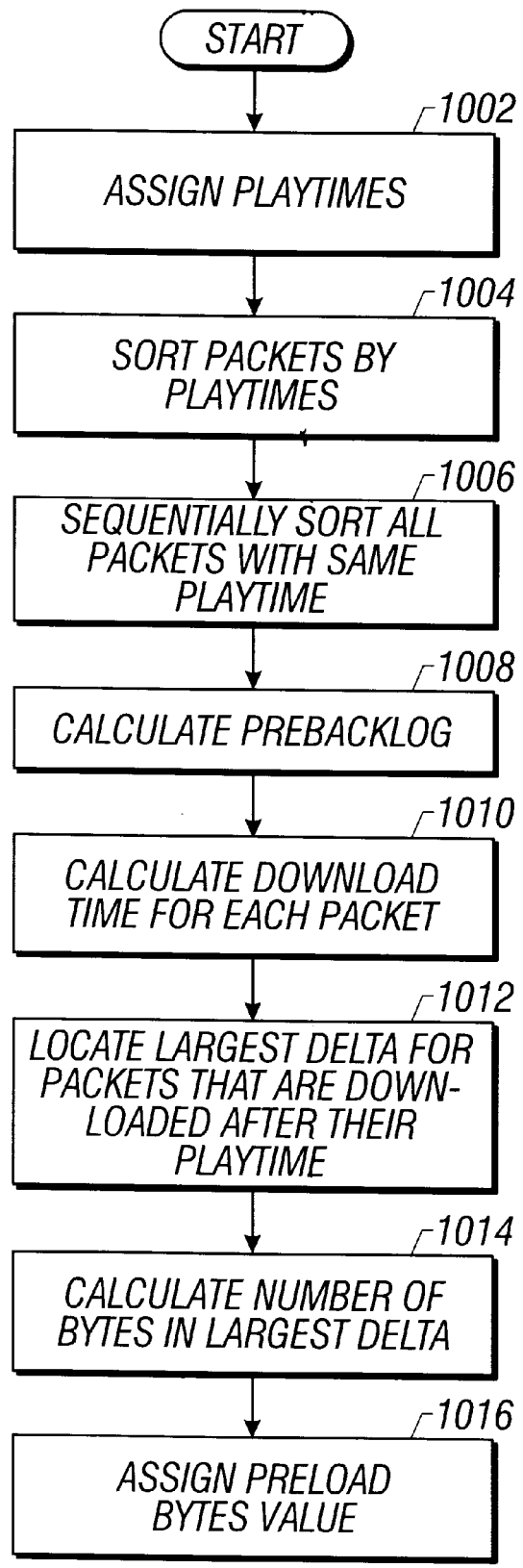
FIG. 10 is a flow diagram showing the process by which the scheduler of FIG. 9 minimizes stalls in the progressive slide show.

FIG. 10 is a flow diagram showing the method by which the scheduler 902 schedules the data packets within a slide-show to minimize stalls. First, step 1002 assigns each data packet within the slide show a playtime, depending, for example, on the desired resolution of an image at a particular time. As noted above in connection with FIG. 9, multiple packets can have the same playtime, depending on the author's desires. For example, if a video image consists of 15 total packets, the first 5 image packets can be assigned a particular playtime and the remaining 10 another. As a result, at the playtime for the first 5 packets, that image data will be displayed, and at the playtime for the remaining 10 packets, the image will be completed. Next, step 1004 sorts the packets by the assigned playtime, grouping packets with the same playtime together. Then, in step 1006, for a given playtime, the packets are sorted sequentially. For example, 5 image packets belonging to a single image asset, all of which have the same playtime, will be sorted sequentially, i.e., 1 through 5 in order.

Step 1008 calculates a prebacklog value, which defines a minimum quantity of data downloaded into the player to ensure the player can play. Step 1010 then calculates the download time for each data packet in the stream 910. Next, step 1012 locates any data packets that are downloaded after their playtime has expired and determines the largest delta between playtime and subsequent download. An example of such a delta is shown in FIG. 9, which shows the delta 926 between the playtime and download time of data packet $I_5$, a packet whose download is complete well after its playtime has expired. Step 1014 makes a reverse calculation to determine the number of bytes in the largest delta at a given baud rate. Alternatively, the number of bits or some other measure of data could be used. Step 1016 assigns the calculated number of bytes to be a "preload bytes" value, which defines a minimum number of bytes that player must have received to play the data. If the baud rate remains constant, at the baud rate used in step 1014, no stalls will occur.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A system operating over a limited bandwidth channel, comprising:
   (a) a receiver for receiving a sequence of temporal audio data to be encoded and transmitted over the limited bandwidth channel; and
   (b) a processor for determining a shortage of audio data that could lead to a possible stall on the limited bandwidth channel, the processor including a system look-ahead that uses the determined shortage of sound data to analyze the sequence of temporal audio data to detect a stall condition in the temporal audio data, and if a stall condition is detected, finds a breakpoint in the sequence of temporal audio data and stops the sequence of temporal audio data at the breakpoint.

2. A method for scheduling and processing temporal data and non-temporal data in a unified data stream, comprising:
   (a) interleaving temporal data and non-temporal data to form a unified data stream, at least some of the temporal data being audio data in a temporal compressed format and at least some of the non-temporal data being in a non-temporal compressed format; and
   (b) processing the unified data stream, including:
      (1) decompressing the non-temporal data in the non-temporal compressed format and producing an output image from at least some of the decompressed non-temporal data and any uncompressed non-temporal data, and
      (2) concurrently playing the temporal audio data while decompressing the temporal audio data in the temporal compressed format by (A) searching for a breakpoint in an amount of the temporal audio data, (B) if a breakpoint is found, playing the amount of the temporal audio data to the breakpoint, (c) if no breakpoint is found, determining if the amount of temporal audio data is greater than a predetermined minimum amount of the temporal audio data, and (D) if the amount of the temporal audio data is greater than the predetermined amount of the temporal audio data, playing the amount of the temporal audio data.

3. The method of claim 2 wherein the step of concurrently playing the temporal audio data while decompressing the temporal audio data includes:
   (a) inputting the amount of the temporal audio data from the unified data stream into an input buffer;
   (b) decompressing the temporal audio data in the input buffer to obtain decompressed temporal data;
   (c) inputting the decompressed temporal audio data into an output buffer;
   (d) inputting additional temporal audio data from the unified data stream into the input buffer; and
   (e) playing the decompressed temporal audio data held in the output buffer while decoding the additional temporal audio data.

4. The method of claim 3 wherein the step of playing the decompressed temporal data includes:
   (a) determining if the temporal audio data held in the output buffer is equal to or greater than the predetermined minimum amount of the temporal audio data, the predetermined minimum amount of temporal audio data known as a prestart backlog, or if an end of file ("EOF") flag is held in the output buffer, the EOF flag indicating the end of the temporal audio data contained in the unified data stream;
   (b) if the prestart backlog or the EOF indication is in the output buffer, looking for a breakpoint in the temporal audio data contained in the output buffer;
   (c) if a breakpoint is found, playing the temporal audio data in the output buffer until reaching the breakpoint;
   (d) if no breakpoint is found, determining if the amount of temporal audio data in the output buffer is greater than a maximum backlog, the maximum backlog representing a minimum amount of temporal audio data required to be in the output buffer for playing when no breakpoint is found; and
   (e) if the amount of temporal audio data in the output buffer is greater than the maximum backlog, playing the temporal audio data in the output buffer.

5. The method of claim 4 wherein the step of playing the decompressed temporal audio data further includes:
   (a) detecting if a stall has occurred during playing of the temporal audio data; and
   (b) if a stall condition has occurred, replacing the maximum backlog with a restart backlog, the restart backlog increasing the amount of temporal audio data required to be in the output buffer for playing when no breakpoint is found.

6. The method of claim 2, further comprising:
   (a) setting a plurality of markers in the temporal data at various times in the unified data stream;
   (b) checking the unified data stream to determine a time when each of the plurality of markers is received by a player; and
   (c) dividing an actual playing time between selected markers by the time between receipt of the selected markers to determine a baud rate for the temporal data.

7. The method of claim 5, further comprising:
   (a) setting the maximum backlog, the restart backlog, and the prestart backlog;
   (b) inserting the set maximum backlog, the set restart backlog, and the set prestart backlog into a startup header; and
   (c) placing the input header at the beginning of the unified data stream.

8. The method of claim 2 wherein at least a portion of the temporal audio data is a MIDI file, the MIDI file including a plurality of tracks, each track having a plurality of messages, each message including time data, the method further comprising sorting the MIDI file using the time data to group together messages to form a plurality of MIDI file portions, each MIDI file portion representing a specific time.

9. The method of claim 8, further comprising:
    (a) placing each MIDI file portion into a respective audio segment in the unified data stream, each audio segment having a download time and a play time;
    (b) placing at least one non-temporal data segment between a first audio segment and a second audio segment;
    (c) locating a backlog data gap after the end of the play time of the first audio segment and the end of the download time of the second audio segment; and
    (d) locating at least one non-temporal data segment after the backlog data gap.

10. The method of claim 9, further comprising:
    (a) splitting an audio segment at a breakpoint in the audio segment to form a first split audio segment and a second split audio segment; and
    (b) locating at least one non-temporal segment between the first split audio segment and the second split audio segment.

11. The method of claim 2 wherein the interleaving step includes:
    (a) dividing the temporal audio data into a plurality of audio segments;
    (b) plotting a download time and a play time of a selected audio segment and a next audio segment to determine a latest possible start time ("st") for the next audio segment;
    (c) placing all the audio segments in a latest possible location within the unified data stream to form an initial map that includes the temporal audio data; and
    (d) fitting at least one segment of non-temporal data into any gaps that exist between adjacent audio segments in the initial map and that are sufficiently large to accommodate a segment of non-temporal data.

12. The method of claim 11 wherein the interleaving step further includes:
    (a) detecting whether any overlaps exist between any adjacent audio segments or between any audio segment and any non-temporal segment or between any adjacent non-temporal segments; and
    (b) if any such overlap is detected, moving at least one audio segment to eliminate the overlap.

13. The method of claim 12 wherein the interleaving step further includes:
    (a) after eliminating any overlaps, determining if any adjacent audio segments can be placed next to one another without any gap between the adjacent audio segments; and
    (b) relocating such non-gap audio segments to eliminate the gap in order to conserve space in a header located in the unified data stream.

14. The method of claim 13 wherein the interleaving step further includes eliminating any gaps between adjacent audio and non-temporal segments.

15. The method of claim 2 wherein at least some of the non-temporal data is image data, the method further comprising:
    (a) sending a low resolution version of the image data in the unified data stream before sending additional resolution of the image data;
    (b) displaying the low resolution version; and
    (c) sending the additional resolution of the image data after displaying the low resolution version.

16. The method of claim 15, further comprising sending temporal data while the low resolution version of the image data is being sent and displayed.

17. The method of claim 2 wherein the temporal data includes video data, and wherein the step of decompressing the non-temporal data and producing the output image includes:
    (a) separating the video data into a plurality of data blocks including a set of commands and a set of compressed data;
    (b) forming an event table from the set of commands, the event table having a plurality of entries, each entry having a time and a list of events that occur at the time;
    (c) storing a block of compressed information from the set of compressed data;
    (d) decompressing the compressed block of information in response to a command from the event table, thereby obtaining output pixel data; and
    (e) decoding the output pixel data.

18. The method of claim 17 and wherein the step of decompressing the non-temporal data and producing the output image further includes changing the output pixel data in response to a command from the event table.

19. A system for scheduling and processing non-temporal data and temporal data in a unified data stream, comprising:
    (a) a scheduler, configured to interleave non-temporal data and temporal data to form a unified data stream, at least some of the non-temporal data being in an image compressed format and at least some of the temporal data being audio data in a temporal compressed format; and
    (b) a processor that decompresses the non-temporal data in the non-temporal compressed format, produces an output image from at least some of the decompressed non-temporal data and uncompressed non-temporal data, if any, and concurrently plays the temporal audio data while decompressing the temporal audio data in the temporal compressed format by:
        (1) searching for a breakpoint in an amount of the temporal audio data,
        (2) if a breakpoint is found, playing the amount of the temporal audio data to the breakpoint,
        (3) if no breakpoint is found, determining if the amount of temporal audio data is greater than a predetermined minimum amount of the temporal audio data, and
        (4) if the amount of the temporal audio data is greater than the predetermined amount of the temporal audio data, playing the amount of the temporal audio data.

20. The system of claim 19 wherein the processor includes:
    (a) an input buffer that receives at least some of the temporal audio data from the unified data stream;
    (b) an element that decompresses the temporal audio data in the input buffer to obtain decompressed temporal audio data;
    (c) an output buffer, receiving the decompressed temporal audio data;
    (d) the input buffer receiving additional temporal audio data from the unified data stream;
    (e) a player, playing the decompressed temporal audio data held in the output buffer while the additional temporal audio data is decoded.

21. The system of claim 20 wherein the processor is configured to:
   (a) determine if the temporal audio data held in the output buffer is equal to or greater than the predetermined minimum amount of the temporal audio data, the predetermined minimum amount of temporal audio data known as a prestart backlog, or if an end of file ("EOF") flag is held in the output buffer, the EOF flag indicating the end of the temporal audio data contained in the unified data stream;
   (b) if the prestart backlog or the EOF indication is in the output buffer, look for a breakpoint in the temporal audio data contained in the output buffer;
   (c) if a breakpoint is found, play the temporal audio data in the output buffer until reaching the breakpoint;
   (d) if no breakpoint is found, determine if the amount of temporal audio data in the output buffer is greater than maximum backlog, the maximum backlog representing a minimum amount of temporal audio data required to be in the output buffer for playing when no breakpoint is found; and
   (e) if the amount of temporal audio data in the output buffer is greater than the maximum backlog, play the temporal audio data in the output buffer.

22. The system of claim 21 wherein the processor is further configured to:
   (a) detect if a stall has occurred during playing of the temporal audio data; and
   (b) if a stall condition has occurred, replace the maximum backlog with a restart backlog, the restart backlog increasing the amount of temporal audio data required to be in the output buffer for playing when no breakpoint is found.

23. The system of claim 19 wherein the scheduler is configured to:
   (a) set a plurality of markers in the temporal data at various times in the unified data stream;
   (b) check the unified data stream to determine a time when each of the plurality of markers is received by a player; and
   (c) divide an actual playing time between selected markers by the time between receipt of the selected markers to determine a baud rate for the temporal data.

24. The system of claim 22 wherein the scheduler is further configured to:
   (a) set the maximum backlog, the restart backlog, and the prestart backlog;
   (b) insert the set maximum backlog, the set restart backlog, and the set prestart backlog into a startup header; and
   (c) place the input header at the beginning of the unified data stream.

25. The system of claim 19 wherein at least a portion of the temporal audio data is a MIDI file, the MIDI file including a plurality of tracks, each track having a plurality of messages, each message including time data, and wherein the scheduler is configured to sort the MIDI file using the time data to group together messages to form a plurality of MIDI file portions, each MIDI file portion representing a specific time.

26. The system of claim 25 wherein the scheduler is further configured to:
   (a) place each MIDI file portion into a respective audio segment in the unified data stream, each audio segment having a download time and a play time;
   (b) place at least one image data segment between a first audio segment and a second audio segment;
   (c) locate a backlog data gap after the end of the play time of the first audio segment and the end of the download time of the second audio segment; and
   (d) locate at least one image data segment after the backlog data gap.

27. The system of claim 19 wherein the scheduler is configured to:
   (a) divide the temporal audio data into a plurality of audio segments;
   (b) plot a download time and a play time of a selected audio segment and a next audio segment to determine a latest possible start time ("st") for the next audio segment;
   (c) place all the audio segments in a latest possible location within the unified data stream to form an initial map that includes the temporal audio data; and
   (d) fit at least one segment of non-temporal data into any gaps that exist between adjacent audio segments in the initial map and that are sufficiently large to accommodate a segment of non-temporal data.

28. The system of claim 27 wherein the scheduler is further configured to:
   (a) detect whether any overlaps exist between any adjacent audio segments or between any audio segment and any non-temporal segment or between any adjacent non-temporal segments; and
   (b) if any such overlap is detected, move at least one audio segment to eliminate the overlap.

29. The system of claim 28 wherein the scheduler is further configured to:
   (a) after eliminating any overlaps, determine if any adjacent audio segments can be placed next to one another without any gap between the adjacent audio segments; and
   (b) relocate such non-gap audio segments to eliminate the gap in order to conserve space in a header located in the unified data stream.

30. The system of claim 29 wherein the scheduler is further configured to eliminate any gaps between adjacent audio and non-temporal segments.

31. The system of claim 19 wherein the non-temporal data includes image data, the method further comprising:
   (a) an transmission element that allows sending of a low resolution version of the image data in the unified data stream before sending additional resolution of the image data;
   (b) a display, displaying the low resolution version; and
   (c) the transmission element sending the additional resolution of the image data after the low resolution version is displayed.

32. The system of claim 31 wherein the transmission element sends temporal data while the low resolution version of the image data is being sent and displayed.

33. The system of claim 19 wherein the temporal data includes video data, and wherein the processor is configured to:
   (a) separate the video data into a plurality of data blocks including a set of commands and a set of compressed data;
   (b) form an event table from the set of commands, the event table having a plurality of entries, each entry having a time and a list of events that occur at the time;

(c) store a block of compressed information from the set of compressed data;

(d) decompress the compressed block of information in response to a command from the event table, thereby obtaining output pixel data; and (e) decode the output pixel data.

34. The system of claim 33 wherein the processor is further configured to change the output pixel data in response to a command from the event table.

35. A method for determining a baud rate for temporal data in a unified data stream that includes temporal and non-temporal data, the method comprising:

(a) interleaving temporal data and non-temporal data to form the unified data stream;

(a) setting a plurality of markers in the temporal data at various times in the unified data stream;

(b) checking the unified data stream to determine a time when each of the plurality of markers is received by a player; and (c) dividing an actual playing time between selected markers by the time between receipt of the selected markers to determine a baud rate for the temporal data.

36. A method for reducing stalls in images displayed in a computer animated slide-show, comprising:

(a) interleaving temporal data and non-temporal data to create a computer slide-show embodied in a unified data stream, the unified data stream including a plurality of image packets and a plurality of non-temporal data packets;

(b) assigning a playtime to each of the image packets;

(c) sorting the image packets by playtime;

(c) sequentially sorting the image packets that are assigned the same playtime;

(d) calculating a download time for each image packet;

(e) locating a latest image packet having a download time that is completed the longest time after the playtime for that image data;

(f) calculating a data gap, the data gap being the difference between the download time and the playtime of the latest image packet; and (g) playing the unified data stream only when an amount of data from the unified data stream that is at least a great as the data gap has been received.

37. A method for scheduling and processing a computer slide-show, the slide-show including image data and audio data in a unified data stream, the method comprising:

(a) interleaving image data, audio data, and command data to form a slide-show embodied in a unified data stream; and (b) processing the unified data stream, including:

(1) separating the image data, the audio data, and the command data, (2) generating a plurality of time-event commands from the command data, each time-event command including a time indicator and an event of the slide-show that occurs at the time corresponding to the time indicator, (3) separating the image data into a plurality of image elements, each element including at least one image data packet, each image data packet having a corresponding time-event command, (4) separating the audio data into a plurality of sound elements, each element including at least one audio data packet, each audio data packet having a corresponding time-event command, (5) decoding each of the image data packets in response to the corresponding time-event command, and (6) decoding each of the audio data packets in response to the corresponding time-event command.

38. The method of claim 37 wherein the processing step further includes:

(a) image processing each of the image data packets in response to a corresponding time-event command, if any; and (b) audio processing each of the audio data packets in response to a corresponding time-event command, if any.

39. The method of claim 38 wherein the processing step further includes:

(a) storing at least one of the decoded image packets so that the stored image packet can be processed at essentially any time, (b) storing at least one of the decoded audio packets so that the stored audio packet can be processed at essentially any time.

40. The method of claim 38, further comprising concurrently performing steps (1) through (6) of the processing step.

41. The system of claim 26 wherein the scheduler is further configured to:

(a) split an audio segment at a breakpoint in the audio segment to form a first split audio segment and a second split audio segment; and (b) locate at least one non-temporal segment between the first split audio segment and the second split audio segment.

42. The method of claim 38 wherein the step of separating the image data, the audio data, and the command data includes programmably controlling separation of the image data, the audio data, and the command data by an author command.

43. The method of claim 38 wherein the processing step further includes the step of progressively displaying the decoded image data packets so that an image formed by the image data packets is rendered over time in progressively greater resolution until the image is essentially completely displayed.

44. The method of claim 38 wherein the processing step further includes the steps of separating the image data packets into a plurality of image asset groups and processing each of the plurality of image asset groups by a corresponding image asset processor.

45. A method for scheduling and processing temporal data and non-temporal data in a unified data stream, comprising:

(a) interleaving temporal data and non-temporal data to form a unified data stream, at least some of the temporal data being a MIDI audio file in a temporal compressed format, at least some of the non-temporal data being in a non-temporal compressed format, the MIDI audio file including at least one track having a plurality of messages, each message including time data;

(b) sorting the MIDI audio file using the time data to group together messages to form a plurality of MIDI audio file portions, each MIDI audio file portion representing a specific time; and (c) processing the unified data stream, including:

(1) decompressing the non-temporal data in the non-temporal compressed format and producing an output image from at least some of the decompressed non-temporal data and any uncompressed non-temporal data, and (2) concurrently playing and decompressing the sorted MIDI audio file in the temporal compressed format.

46. The method of claim 45, further comprising:
(a) placing each MIDI audio file portion into a respective audio segment in the unified data stream, each audio segment having a download time and a play time;
(b) placing at least one non-temporal data segment between a first audio segment and a second audio segment;
(c) locating a backlog data gap after the end of the play time of the first audio segment and the end of the download time of the second audio segment; and
(d) locating at least one non-temporal data segment after the backlog data gap.

47. The method of claim 46, further comprising:
(a) splitting an audio segment at a breakpoint in the audio segment to form a first split audio segment and a second split audio segment; and
(b) locating at least one non-temporal segment between the first split audio segment and the second split audio segment.

48. A method for transmitting data over a limited bandwidth channel, comprising:
(a) receiving a sequence of temporal audio data to be encoded;
(b) determining a shortage of audio data that could lead to a possible system stall on the limited bandwidth channel;
(c) using the determined shortage of sound data to analyze the sequence of temporal audio data to detect a stall condition in the temporal audio data; and
(d) if a stall condition is detected, finding a breakpoint in the sequence of temporal audio data and stopping transmission of the sequence of temporal audio data at the breakpoint.

* * * * *